US011867117B2

(12) United States Patent
Clayton et al.

(10) Patent No.: US 11,867,117 B2
(45) Date of Patent: Jan. 9, 2024

(54) USE AND METHOD TO REDUCE DEPOSITS IN COMPRESSION IGNITION INTERNAL COMBUSTION ENGINES

(71) Applicant: SHELL OIL COMPANY, Houston, TX (US)

(72) Inventors: Christopher William Clayton, London (GB); Michael Gee, London (GB); Rodney Glyn Williams, London (GB); Emma Wyatt, London (GB); Alan Norman Ross, Kent (GB); Keith Woodall, Ellesmere Port (GB); Jacqueline Glen Reid, Ellesmere Port (GB); Simon Christopher Mulqueen, Ellesmere Port (GB); Stephen Leonard Cook, Ellesmere Port (GB)

(73) Assignee: SHELL USA, INC., Houston, TX (US)

( * ) Notice: Subject to any disclaimer, the term of this patent is extended or adjusted under 35 U.S.C. 154(b) by 181 days.

(21) Appl. No.: 17/311,787

(22) PCT Filed: Dec. 9, 2019

(86) PCT No.: PCT/EP2019/084283
§ 371 (c)(1),
(2) Date: Jun. 8, 2021

(87) PCT Pub. No.: WO2020/120416
PCT Pub. Date: Jun. 18, 2020

(65) Prior Publication Data

US 2022/0025286 A1 Jan. 27, 2022

(30) Foreign Application Priority Data

Dec. 11, 2018 (EP) .................................... 18211571

(51) Int. Cl.
*F02B 77/04* (2006.01)
*C10L 1/18* (2006.01)
(Continued)

(52) U.S. Cl.
CPC ............ *F02B 77/04* (2013.01); *C10L 1/1811* (2013.01); *C10L 1/231* (2013.01); *C10L 10/04* (2013.01);
(Continued)

(58) Field of Classification Search
CPC ........ C10L 1/1811; C10L 1/231; C10L 10/04; C10L 2200/0446; C10L 2270/026; F02B 77/04; F02M 26/13
See application file for complete search history.

(56) References Cited

U.S. PATENT DOCUMENTS 4,125,566 A 11/1978 Trin Dinh et al.
4,385,193 A 5/1983 Bijwaard et al.
(Continued)

FOREIGN PATENT DOCUMENTS

CN 104832253 A 8/2015
EP 0147240 A2 7/1985
(Continued)

OTHER PUBLICATIONS

Jacob, EP 2907866, machine translation. (Year: 2015).*
(Continued)

*Primary Examiner* — Hung Q Nguyen
*Assistant Examiner* — Mark L. Greene
(74) *Attorney, Agent, or Firm* — SHELL USA, INC.

(57) ABSTRACT

Use of an additive selected from nitrate compounds, peroxide compounds, nitrite compounds and polyether compounds, and mixtures thereof in a diesel fuel composition for reducing the build-up of deposits in an Exhaust Gas Recir-
(Continued)

culation (EGR) system of a compression ignition internal combustion engine.

8 Claims, 1 Drawing Sheet

(51) Int. Cl.

| | |
|---|---|
| ***C10L 1/23*** | (2006.01) |
| ***C10L 10/04*** | (2006.01) |
| *F02M 26/13* | (2016.01) |

(52) U.S. Cl.

CPC . *C10L 2200/0446* (2013.01); *C10L 2270/026* (2013.01); *F02M 26/13* (2016.02)

(56) References Cited

U.S. PATENT DOCUMENTS

| | | | | |
|---|---|---|---|---|
| 4,478,955 | A | 10/1984 | Pesa et al. | |
| 4,482,355 | A | 11/1984 | Hanlon | |
| 4,594,468 | A | 6/1986 | Minderhound et al. | |
| 5,516,343 | A * | 5/1996 | Su | C10L 1/143 508/284 |
| 5,803,162 | A | 9/1998 | Karbach et al. | |
| 8,470,058 | B2 | 6/2013 | Paggi | |
| 2011/0099979 | A1 | 5/2011 | Xu et al. | |
| 2013/0160354 | A1 | 6/2013 | Bansie et al. | |
| 2018/0238230 | A1 | 8/2018 | Thompson et al. | |

FOREIGN PATENT DOCUMENTS

| | | | |
|---|---|---|---|
| EP | 0482253 | A1 | 4/1992 |
| EP | 0557516 | A | 9/1993 |
| EP | 0583836 | A1 | 2/1994 |
| EP | 0613938 | A1 | 9/1994 |
| EP | 2907866 | A1 | 8/2015 |
| GB | 960493 | A | 6/1964 |
| WO | 9842808 | A1 | 10/1998 |
| WO | 2017203003 | A1 | 11/2017 |
| WO | 2020036870 | A1 | 2/2020 |

OTHER PUBLICATIONS

International Search Report and Written Opinion received for PCT Patent Application No. PCT/EP2019/084283, dated Jan. 28, 2020, 09 pages.

Van Der Burgt et al., "The Shell Middle Distillate Synthesis Process", paper delivered at 5th Synfuels Worldwide Symposium, Nov. 1985, pp. 1-15.

Van Der Burgt et al., "The Shell Middle Distillate Synthesis Process", Petroleum Review, Apr. 1990. pp. 204-206 and 208-209.

Bhaskar et al., "Examination of EGR Cooler Fouling and Engine Efficiency Improvement in Compression Ignition Engines", Dissertation, May 1, 2013, pp. 167-168, XP055586486.

Office Action Received for Chinese Application No. 201980082140.9, dated May 30, 2022, 18 Pages(9 Pages of English Translation and 9 Pages of Official Copy).

Van Der Burgt et al., "The Shell Middle Distillate Synthesis Process", Petroleum Review, Apr. 1990, pp. 204-206 and pp. 208-209.

Office Action Received for Russian Application No. 2021120282, dated Apr. 17, 2023, 10 Pages (3 Pages of English Translation and 7 Pages of Official Copy).

Office Action Received for Japanese Application No. 2019116587, dated Sep. 28, 2023, 8 Pages(4 Pages of English Translation and 4 Pages of Official Copy).

* cited by examiner

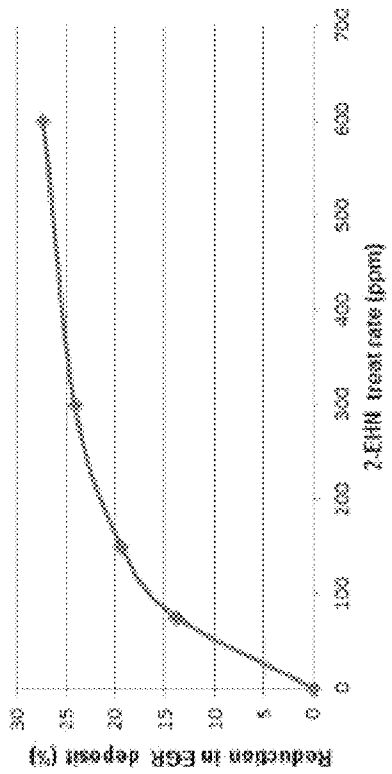
Reduction in EGR deposit (%)
0
5
10
15
20
25
30
2-EHN treat rate (ppm)
0
100
200
300
400
500
600
700

USE AND METHOD TO REDUCE DEPOSITS IN COMPRESSION IGNITION INTERNAL COMBUSTION ENGINES

CROSS REFERENCE TO RELATED APPLICATIONS

This is a National stage application of International application No. PCT/EP2019/084283, filed 9 Dec. 2019, which claims priority of European application No. 18211571.7, filed 11 Dec. 2018, which is incorporated herein by reference in its entirety.

FIELD OF THE INVENTION

The present invention relates to the use of an additive for providing certain benefits in an Exhaust Gas Recirculation (EGR) system in a compression ignition engine. In particular, the present invention relates to the use of an additive for reducing the build-up of deposits in an Exhaust Gas Recirculation system in a compression ignition engine.

BACKGROUND OF THE INVENTION

Exhaust Gas Recirculation (EGR) is a NOx emission control technique applicable to a wide range of diesel engines including light-, medium- and heavy-duty applications. The configuration of an EGR system depends on the required EGR rate and other demands of the particular application. Most EGR systems include the following main hardware components: one or more EGR control valves, one or more EGR coolers, piping, flanges and gaskets.

It has been found that EGR systems have a tendency to become fouled by deposits that build up on the various EGR hardware components. This is a particular problem with high pressure, short loop EGR systems. Deposits forming in the system can cause increased NOx emissions and fuel consumption and can cause the system to fail by jamming the EGR valve in severe cases. Oxidation catalysts and/or particulate filters can be fitted before the EGR system to reduce hydrocarbons and particulates from the exhaust gas which cause EGR fouling, but this adds cost and complexity and therefore isn't widely employed by manufacturers. In the case of low pressure EGR, the DPF is situated between the engine and the low pressure EGR system, therefore deposits are not such a problem in these configurations.

It would therefore be desirable to provide a fuel based solution that reduces or prevents the build-up of deposits in the first instance, and may be applicable to all EGR systems, irrespective of the equipment that the manufacturer has employed.

It has now been surprisingly found that by using a selected additive in a diesel fuel composition, a surprising and hitherto unrecognised reduction in EGR deposits can be achieved.

SUMMARY OF THE INVENTION

According to the present invention there is provided the use of an additive selected from nitrate compounds, peroxide compounds, nitrite compounds, polyether compounds, and mixtures thereof in a diesel fuel composition for reducing the build-up of deposits in an Exhaust Gas Recirculation (EGR) system of a compression ignition internal combustion engine.

According to another aspect of the present invention there is provided a method for reducing the build-up of deposits in an Exhaust Gas Recirculation (EGR) system of a compression ignition internal combustion engine, which method comprises a step of introducing into said engine a diesel fuel composition which comprises an additive selected from nitrate compounds, peroxide compounds, nitrite compounds, polyether compounds, and mixtures thereof.

It has been found that use of an additive selected from nitrate compounds, peroxide compounds, nitrite compounds, and/or polyether compounds in a diesel fuel composition can reduce the build-up of deposits in the EGR system of a compression ignition internal combustion engine.

It has also been found that use of an additive selected from nitrate compounds, peroxide compounds, nitrite compounds, polyether compounds, and mixtures thereof in a diesel fuel composition can prevent the formation of deposits in the EGR system in the first place and is applicable to all EGR systems, irrespective of the equipment that the manufacturer has employed.

BRIEF DESCRIPTION OF THE DRAWINGS

FIG. 1 shows the results of Examples 2, 3, 4 and 5 (Tables 2, 3, 4 and 5) in graphical form.

DETAILED DESCRIPTION OF THE INVENTION

As used herein there is provided the use of an additive selected from nitrate compounds, peroxide compounds, nitrite compounds, polyether compounds, and mixtures thereof in a diesel fuel composition for the purpose of reducing the build-up of deposits in an EGR system of a compression ignition engine. Hence this additive is referred to herein as an 'EGR deposit control additive'.

In the context of the present invention, the term "reducing the build-up of deposits" embraces any degree of reduction in the build-up of deposits. The reduction in the build-up of deposits may be of the order of 10% or more, preferably 20% or more, more preferably 50% or more, and especially 70% or more compared to the build-up of deposits in an EGR system caused by an analogous fuel formulation which does not contain an EGR deposit control additive. As used herein, the term "reducing the build-up" also encompasses the prevention of EGR deposit formation in the first place.

It has been found that the present invention is particularly useful in the case of high pressure, short loop EGR systems, because these systems are more susceptible to deposit build-up than low pressure EGR systems.

In particular, it has been found that the present invention is particularly useful in the case where the compression ignition internal combustion engine comprises a fuel system having a rated operating pressure of greater than 1300 bar.

It is also envisaged that the present invention may be used for the purpose of clean-up of existing EGR deposits formed with conventional diesel fuel.

A typical EGR system comprises an intake pipe, a valve, a housing, a cooler and an outlet pipe. Deposits tend to build up on the interior surfaces of all portions of the EGR system, especially on the cooler.

The present invention can be used for reducing the build-up of EGR deposits in all parts of the EGR system.

It is particularly important to prevent the build-up of deposits on the EGR valve of the EGR system.

A first essential component herein is an additive selected from nitrate compounds, peroxide compounds, nitrite compounds, polyether compounds, and mixtures thereof.

The nitrate compounds for use herein are preferably hydrocarbyl nitrates. Suitable hydrocarbyl nitrates include those compounds having the formula $R^1$—$ONO_2$ wherein $R^1$ is an optionally substituted hydrocarbyl group. $R^1$ may be a straight chain, branched or cyclic alkyl group or other hydrocarbyl group. Preferably $R^1$ is an optionally substituted $C_1$-$C_{36}$ alkyl group, preferably an optionally substituted $C_2$-$C_{30}$ alkyl group, more preferably an optionally substituted $C_2$-$C_{24}$ alkyl group, even more preferably an optionally substituted $C_2$-$C_{20}$ alkyl group, especially an optionally substituted $C_4$-$C_{16}$ alkyl group, more especially an optionally substituted $C_4$-$C_{12}$ alkyl group, for example an optionally substituted $C_6$-$C_{12}$ alkyl group, an optionally substituted $C_6$-$C_{10}$ alkyl group, or an optionally substituted $C_8$-$C_{10}$ alkyl group.

Preferably $R^1$ is an unsubstituted alkyl group. Preferably, $R^1$ is an unsubstituted $C_1$-$C_{36}$ alkyl group, preferably an unsubstituted $C_2$-$C_{30}$ alkyl group, more preferably an unsubstituted $C_2$-$C_{24}$ alkyl group, even more preferably an unsubstituted $C_2$-$C_{20}$ alkyl group, especially an unsubstituted $C_4$-$C_{16}$ alkyl group, more especially an unsubstituted $C_4$-$C_{12}$ alkyl group, even more especially an unsubstituted $C_6$-$C_{12}$ alkyl group, for example an unsubstituted $C_6$-$C_{10}$ alkyl group. In a particularly preferred embodiment, $R^1$ is an unsubstituted $C_8$-$C_{10}$ alkyl group.

In one embodiment, $R^1$ is a branched chain $C_4$-$C_{16}$ alkyl group, preferably a branched chain $C_4$ to $C_{12}$ alkyl group, more preferably a branched chain $C_6$-$C_{12}$ alkyl group, especially a branched chain $C_6$-$C_{10}$ alkyl group, for example a branched chain $C_8$-$C_{10}$ alkyl group. When $R^1$ is a branched chain alkyl group, it is preferably unsubstituted.

Examples of alkyl nitrate compounds suitable for use herein include 2-n-propylheptyl nitrate, 2-isopropylheptyl nitrate, 2-n-propyl-4-methylhexyl nitrate, 2-isopropyl-4-methylhexyl nitrate, 2-n-propyl-5-methylhexyl nitrate, 2-isopropyl-5-methylhexyl nitrate, 2-n-propyl-4,4-dimethylpentyl nitrate, 2-isopropyl-4,4-dimethylpentyl nitrate, 2-ethylhexyl nitrate, decyl nitrate, dodecyl nitrate, cyclohexyl nitrate, isopropyl nitrate, and mixtures thereof.

Preferred alkyl nitrate compounds for use herein are selected from decyl nitrate, dodecyl nitrate, isopropyl nitrate, 2-ethylhexyl nitrate, and mixtures thereof.

A particularly preferred alkyl nitrate compound for use herein is 2-ethylhexyl nitrate.

The peroxide compounds for use herein include any compound having at least one oxygen-oxygen bond.

Suitable peroxide compounds include those disclosed in U52014/150333 and U52011/099979.

Preferred peroxide compounds for use herein are alkyl peroxides, preferably dialkyl peroxides.

Preferably the peroxide compounds are selected from compounds having the formula $R^2$—O—O—$R^3$, wherein $R^2$ is an optionally substituted alkyl, aryl, alkaryl, aralkyl or acyl group, and $R^3$ is hydrogen or an optionally substituted alkyl, aryl, alkaryl, aralkyl, or acyl group.

$R^2$ and $R^3$ may be the same or different. Preferably $R^2$ is the same as $R^3$. $R^2$ and $R^3$ may be straight chain, branched chain or cyclic.

In a preferred embodiment $R^2$ and $R^3$ are independently selected from an optionally substituted alkyl, aryl, alkaryl, aralkyl or acyl group, preferably an optionally substituted alkyl or acyl group, even more preferably an optionally substituted alkyl group, having from 1 to 36 carbon atoms, preferably 1 to 24 carbon atoms, more preferably 1 to 16 carbon atoms, even more preferably 2 to 10 carbon atoms, especially 2 to 6 carbon atoms.

$R^2$ and $R^3$ are preferably unsubstituted alkyl groups having from 1 to 36 carbon atoms, preferably 1 to 24 carbon atoms, more preferably 1 to 18 carbon atoms, even more preferably 1 to 12 carbon atoms, especially 2 to 10 carbon atoms, more especially 2 to 8 carbon atoms, even more especially 2 to 6 carbon atoms, for example 3 to 6 carbon atoms.

$R^2$ and $R^3$ are preferably branched alkyl groups, preferably having 3 to 12 carbon atoms, preferably 3 to 8 carbon atoms, more preferably 3 to 5 carbon atoms.

Preferably $R^2$ and $R^3$ are tert-butyl.

Other suitable peroxide compounds for use herein include two or more oxygen-oxygen bonds. For example, the peroxide compound may comprise a compound having the formula $R^4$—O—O—$[R^5$—O—O$]_n$—$R^6$, wherein each of $R^4$ and $R^6$ is independently an optionally substituted alkyl, aryl, alkaryl, aralkyl or acyl group, each $R^5$ is independently an optionally substituted alkylene, arylene, alkarylene or aralkylene group, and n is at least 1. Preferably n is 1 or 2, more preferably 1.

Preferably $R^4$ and $R^6$ are each independently selected from an optionally substituted alkyl, aryl, alkaryl, aralkyl or acyl group having from 1 to 36 carbon atoms, preferably from 1 to 24 carbon atoms, preferably from 1 to 16 carbon atoms, more preferably from 2 to 10 carbon atoms, for example from 2 to 6 carbon atoms. Preferably, $R^5$ is an optionally substituted alkylene, arylene, alkarylene or aralkylene group having from 1 to 36 carbon atoms, preferably from 1 to 24 carbon atoms, preferably from 1 to 16 carbon atoms, more preferably 2 to 10 carbon atoms, for example from 2 to 6 carbon atoms. One example of this type of compound is 2,5-dimethyl-2,5-di(tert-butylperoxy) hexane.

The peroxide compound can also be a cyclic compound comprising more than one oxygen-oxygen bond, for example, 3,6,9-triethyl-3,6,9-trimethyl-1,4,7-triperoxonane.

Suitable peroxide compounds for use herein include alkyl peroxides, aryl peroxides, alkyl aryl peroxides, acyl peroxides, peroxy esters, peroxy ketones, per acids, hydroperoxides, and mixtures thereof.

Examples of suitable peroxide compounds for use herein include di-tert-butyl peroxide, cumyl peroxide, 2,5-dimethyl-2,5-di(tert-butyl peroxy) hexane, tert-butyl cumyl peroxide, benzoyl peroxide, tert-butyl peracetate, 3,6,9-triethyl-3,9-trimethyl-1,4,7-triperoxonan, peroxy acetic, and tert-butyl hydroperoxide, cumene hydroperoxide, cyclohexyl hydroperoxide and dicyclohexyl hydroperoxide.

A particularly preferred peroxide compound for use herein is di-tert-butyl peroxide.

The nitrite compounds for use herein are preferably hydrocarbyl nitrites. Suitable hydrocarbyl nitrites include those compounds having the formula $R^7$—ONO wherein $R^7$ is an optionally substituted hydrocarbyl group. $R^7$ may be a straight chain, branched or cyclic alkyl group or other hydrocarbyl group. Preferably $R^7$ is an optionally substituted $C_1$-$C_{36}$ alkyl group, preferably an optionally substituted $C_2$-$C_{30}$ alkyl group, more preferably an optionally substituted $C_2$-$C_{24}$ alkyl group, even more preferably an optionally substituted $C_2$-$C_{20}$ alkyl group, especially an optionally substituted $C_4$-$C_{16}$ alkyl group, more especially an optionally substituted $C_4$-$C_{12}$ alkyl group, for example an optionally substituted $C_4$-$C_8$ alkyl group, or an optionally substituted $C_4$-$C_6$ alkyl.

Preferably $R^7$ is an unsubstituted alkyl group. Preferably, $R^7$ is an unsubstituted $C_1$-$C_{36}$ alkyl group, preferably an unsubstituted $C_2$-$C_{30}$ alkyl group, more preferably an unsubstituted $C_2$-$C_{24}$ alkyl group, even more preferably an unsubstituted $C_2$-$C_{20}$ alkyl group, especially an unsubstituted $C_4$-$C_{16}$ alkyl group, more especially an unsubstituted $C_4$-$C_{12}$ alkyl group, even more especially an unsubstituted $C_4$-$C_8$ alkyl group, for example an unsubstituted $C_4$-$C_6$ alkyl group.

In one embodiment, $R^7$ is a branched chain $C_4$-$C_{16}$ alkyl group, preferably a branched chain $C_4$ to $C_{12}$ alkyl group, more preferably a branched chain $C_4$-$C_8$ alkyl group, especially a branched chain $C_4$-$C_6$ alkyl group, for example a branched chain $C_4$-$C_5$ alkyl group.

Examples of alkyl nitrite compounds suitable for use herein include amyl nitrite, isoamyl nitrite, butyl nitrite, isobutyl nitrite, and mixtures thereof.

Suitable polyether compounds for use herein include oligomers and polymers of ethylene oxide, propylene oxide and butylene oxide, whether terminated by hydroxyl, hydrocarbyloxy, or ester groups or by mixtures of such groups. Where such polyethers are generated from more than one such hydrocarbyl oxide (epoxide), such oligomers or polymers may be block or random copolymers.

In a preferred embodiment of the present invention the additive is selected from alkyl nitrates, alkyl peroxides, and mixtures thereof.

A particularly preferred additive for use herein is 2-ethylhexyl nitrate.

The EGR deposit control additive is preferably used herein at a level in the range of from 1 to 10000 ppm, preferably from 10 to 5000 ppm, more preferably from 20 to 2000 ppm, even more preferably from 50 to 1000 ppm, especially from 50 to 700 ppm, even more especially from 50 to 500 ppm, for example from 50 to 350 ppm. In one embodiment herein, the EGR deposit control additive is used at a level of from 50 to 300 ppm, based on the total weight of the diesel fuel composition.

A diesel fuel composition prepared for use in the present invention may in general be any type of diesel fuel composition suitable for use in a compression ignition (diesel) engine. It may contain, in addition to the EGR deposit control additive described above, other standard diesel fuel components. It may, for example, include a major proportion of a diesel base fuel, for instance of the type described below. Again a "major proportion" means typically 85% w/w or greater based on the overall composition, more suitably 90 or 95% w/w or greater, most preferably 98 or 99 or 99.5% w/w or greater.

Thus, in addition to the EGR deposit control additive, a diesel fuel composition prepared for use in the present invention may comprise one or more diesel fuel components of conventional type. Such components will typically comprise liquid hydrocarbon middle distillate fuel oil(s), for instance petroleum derived gas oils. In general such fuel components may be organically or synthetically derived, and are suitably obtained by distillation of a desired range of fractions from a crude oil. They will typically have boiling points within the usual diesel range of 150 to 410° C. or 170 to 370° C., depending on grade and use. Typically the fuel composition will include one or more cracked products, obtained by splitting heavy hydrocarbons.

A petroleum derived gas oil may for instance be obtained by refining and optionally (hydro)processing a crude petroleum source. It may be a single gas oil stream obtained from such a refinery process or a blend of several gas oil fractions obtained in the refinery process via different processing routes. Examples of such gas oil fractions are straight run gas oil, vacuum gas oil, gas oil as obtained in a thermal cracking process, light and heavy cycle oils as obtained in a fluid catalytic cracking unit and gas oil as obtained from a hydrocracker unit. Optionally a petroleum derived gas oil may comprise some petroleum derived kerosene fraction.

Such gas oils may be processed in a hydrodesulphurisation (HDS) unit so as to reduce their sulphur content to a level suitable for inclusion in a diesel fuel composition.

A diesel base fuel may be or comprise a Fischer-Tropsch derived diesel fuel component, typically a Fischer-Tropsch derived gas oil. In the context of the present invention, the term "Fischer-Tropsch derived" means that a material is, or derives from, a synthesis product of a Fischer-Tropsch condensation process. The term "non-Fischer-Tropsch derived" may be interpreted accordingly. A Fischer-Tropsch derived fuel or fuel component will therefore be a hydrocarbon stream in which a substantial portion, except for added hydrogen, is derived directly or indirectly from a Fischer-Tropsch condensation process.

The Fischer-Tropsch reaction converts carbon monoxide and hydrogen into longer chain, usually paraffinic, hydrocarbons:

$$n(CO+2H_2)=(-CH_2-)_n+nH_2O+\text{heat},$$

in the presence of an appropriate catalyst and typically at elevated temperatures (e.g. 125 to 300° C., preferably 175 to 250° C.) and/or pressures (e.g. 0.5 to 10 MPa, preferably 1.2 to 5 MPa). Hydrogen:carbon monoxide ratios other than 2:1 may be employed if desired.

The carbon monoxide and hydrogen may themselves be derived from organic, inorganic, natural or synthetic sources, typically either from natural gas or from organically derived methane.

A Fischer-Tropsch derived diesel fuel component of use in the present invention may be obtained directly from the refining or the Fischer-Tropsch reaction, or indirectly for instance by fractionation or hydrotreating of the refining or synthesis product to give a fractionated or hydrotreated product. Hydrotreatment can involve hydrocracking to adjust the boiling range (see e.g. GB-B-2077289 and EP-A-0147873) and/or hydroisomerisation which can improve cold flow properties by increasing the proportion of branched paraffins. EP-A-0583836 describes a two-step hydrotreatment process in which a Fischer-Tropsch synthesis product is firstly subjected to hydroconversion under conditions such that it undergoes substantially no isomerisation or hydrocracking (this hydrogenates the olefinic and oxygen-containing components), and then at least part of the resultant product is hydroconverted under conditions such that hydrocracking and isomerisation occur to yield a substantially paraffinic hydrocarbon fuel. The desired fraction (s), typically gas oil fraction(s), may subsequently be isolated for instance by distillation.

Other post-synthesis treatments, such as polymerisation, alkylation, distillation, cracking-decarboxylation, isomerisation and hydroreforming, may be employed to modify the properties of Fischer-Tropsch condensation products, as described for instance in U.S. Pat. Nos. 4,125,566 and 4,478,955.

Typical catalysts for the Fischer-Tropsch synthesis of paraffinic hydrocarbons comprise, as the catalytically active component, a metal from Group VIII of the periodic table of the elements, in particular ruthenium, iron, cobalt or nickel. Suitable such catalysts are described for instance in EP-A-0583836.

An example of a Fischer-Tropsch based process is the Shell™ "Gas-to-liquids" or "GtL" technology (formerly known as the SMDS (Shell Middle Distillate Synthesis) and described in "The Shell Middle Distillate Synthesis Process", van der Burgt et al, paper delivered at the 5th Synfuels Worldwide Symposium, Washington DC, November 1985, and in the November 1989 publication of the same title from Shell International Petroleum Company Ltd, London, UK). In the latter case, preferred features of the hydroconversion process may be as disclosed therein. This process produces middle distillate range products by conversion of a natural gas into a heavy long chain hydrocarbon (paraffin) wax which can then be hydroconverted and fractionated.

For use herein, a Fischer-Tropsch derived fuel component is preferably any suitable component derived from a gas to liquid synthesis (hereinafter a GtL component), or a component derived from an analogous Fischer-Tropsch synthesis, for instance converting gas, biomass or coal to liquid (hereinafter an XtL component). A Fischer-Tropsch derived component is preferably a GtL component. It may be a BtL (biomass to liquid) component. In general a suitable XtL component may be a middle distillate fuel component, for instance selected from kerosene, diesel and gas oil fractions as known in the art; such components may be generically classed as synthetic process fuels or synthetic process oils. Preferably an XtL component for use as a diesel fuel component is a gas oil.

Diesel fuel components contained in a composition prepared for use in the present invention will typically have a density of from 750 to 900 kg/$m^3$, preferably from 800 to 860 kg/$m^3$, at 15° C. (ASTM D-4052 or EN ISO 3675) and/or a VK 40 of from 1.5 to 6.0 $mm^2$/s (ASTM D-445 or EN ISO 3104).

In a diesel fuel composition prepared for use in the present invention, the base fuel may itself comprise a mixture of two or more diesel fuel components of the types described above. It may be or contain a so-called "biodiesel" fuel component such as a vegetable oil, hydrogenated vegetable oil or vegetable oil derivative (e.g. a fatty acid ester, in particular a fatty acid methyl ester) or another oxygenate such as an acid, ketone or ester. Such components need not necessarily be bio-derived.

An automotive diesel fuel composition prepared for use in the present invention will suitably comply with applicable current standard specification(s) such as for example EN 590 (for Europe) or ASTM D-975 (for the USA). By way of example, the overall fuel composition may have a density from 820 to 845 kg/$m^3$ at 15° C. (ASTM D-4052 or EN ISO 3675); a T95 boiling point (ASTM D-86 or EN ISO 3405) of 360° C. or less; a measured cetane number (ASTM D-613) of 51 or greater; a VK 40 (ASTM D-445 or EN ISO 3104) from 2 to 4.5 $mm^2$/s; a sulphur content (ASTM D-2622 or EN ISO 20846) of 50 mg/kg or less; and/or a polycyclic aromatic hydrocarbons (PAH) content (IP 391 (mod)) of less than 11% w/w. Relevant specifications may, however, differ from country to country and from year to year, and may depend on the intended use of the fuel composition.

A diesel fuel composition for use herein suitably contains no more than 5000 ppmw (parts per million by weight) of sulphur, typically from 2000 to 5000 ppmw, or from 1000 to 2000 ppmw, or alternatively up to 1000 ppmw. The composition may, for example, be a low or ultra low sulphur fuel, or a sulphur free fuel, for instance containing at most 500 ppmw, preferably no more than 350 ppmw, most preferably no more than 100 or 50 or even 10 ppmw, of sulphur.

An automotive fuel composition prepared for use in the present invention, or a base fuel used in such a composition, may be additivated (additive-containing) or unadditivated (additive-free). If additivated, e.g. at the refinery, it will contain minor amounts of one or more additives selected for example from anti-static agents, pipeline drag reducers, flow improvers (e.g. ethylene/vinyl acetate copolymers or acrylate/maleic anhydride copolymers), lubricity additives, viscosity index (VI) improvers, antioxidants and wax anti-settling agents. Thus, the composition may contain a minor proportion (preferably 1% w/w or less, more preferably 0.5% w/w (5000 ppmw) or less and most preferably 0.2% w/w (2000 ppmw) or less), of one or more fuel additives, in addition to the EGR deposit control additive.

The composition may for example contain a detergent. Detergent-containing diesel fuel additives are known and commercially available. Examples of detergents suitable for the present purpose include polyolefin substituted succinimides or succinamides of polyamines, for instance polyisobutylene succinimides or polyisobutylene amine succinamides, aliphatic amines, Mannich bases or amines and polyolefin (e.g. polyisobutylene) maleic anhydrides. Succinimide dispersant additives are described for example in GB-A-960493, EP-A-0147240, EP-A-0482253, EP-A-0613938, EP-A-0557516 and WO-A-98/42808. Particularly preferred are polyolefin substituted succinimides such as polyisobutylene succinimides.

A fuel additive mixture useable in a fuel composition prepared according to the present invention may contain other components in addition to the detergent. Examples are lubricity enhancers; dehazers, e.g. alkoxylated phenol formaldehyde polymers; anti-foaming agents (e.g. polyether-modified polysiloxanes); ignition improvers (cetane improvers); anti-rust agents (e.g. a propane-1,2-diol semi-ester of tetrapropenyl succinic acid, or polyhydric alcohol esters of a succinic acid derivative, the succinic acid derivative having on at least one of its alpha-carbon atoms an unsubstituted or substituted aliphatic hydrocarbon group containing from 20 to 500 carbon atoms, e.g. the pentaerythritol diester of polyisobutylene-substituted succinic acid); corrosion inhibitors; reodorants; anti-wear additives; anti-oxidants (e.g. phenolics such as 2,6-di-tert-butylphenol, or phenylenediamines such as N,N'-di-sec-butyl-p-phenylenediamine); metal deactivators; combustion improvers; static dissipator additives; cold flow improvers; and wax anti-settling agents.

Unless otherwise stated, the (active matter) concentration of each such additive component in the additivated fuel composition is preferably up to 10000 ppmw, more preferably in the range of 0.1 to 1000 ppmw, advantageously from 0.1 to 300 ppmw, such as from 0.1 to 150 ppmw.

If desired, one or more additive components, such as those listed above, may be co-mixed—preferably together with suitable diluent(s)—in an additive concentrate, and the additive concentrate may then be dispersed into a base fuel or fuel composition. The EGR deposit control additive may, in accordance with the present invention, be incorporated into such an additive formulation.

In the case of a diesel fuel composition, for example, the fuel additive mixture will typically contain a detergent, optionally together with other components as described above, and a diesel fuel-compatible diluent, which may be a mineral oil, a solvent such as those sold by Shell companies under the trade mark "SHELLSOL", a polar solvent such as an ester and, in particular, an alcohol, e.g. hexanol, 2-ethylhexanol, decanol, isotridecanol and alcohol mixtures such as those sold by Shell companies under the trade mark "LINEVOL", especially LINEVOL 79 alcohol which is a mixture of $C_{7-9}$ primary alcohols, or a $C_{12-14}$ alcohol mixture which is commercially available.

The total content of the additives in the fuel composition may be suitably between 0 and 10000 ppmw and preferably below 5000 ppmw.

In this specification, amounts (concentrations, % v/v, ppmw, % w/w) of components are of active matter, i.e. exclusive of volatile solvents/diluent materials.

In the context of the present invention, "use" of an EGR deposit control additive in a fuel composition means incorporating the EGR deposit control additive into the composition, typically as a blend (i.e. a physical mixture) with one or more fuel components (typically diesel base fuels) and optionally with one or more fuel additives. The EGR deposit control additive is conveniently incorporated before the composition is introduced into an engine which is to be run on the composition. Instead or in addition the use may involve running an engine on the fuel composition containing the EGR deposit control additive, typically by introducing the composition into a combustion chamber of the engine.

"Use" of an EGR deposit control additive, in accordance with the present invention, may also embrace supplying such an additive together with instructions for its use in an automotive fuel composition to achieve one or more of the purpose(s) described above, in particular to reduce the build-up of deposits in the EGR system of a compression ignition engine into which the composition is, or is intended to be, introduced.

The EGR deposit control additive may itself be supplied as a component of a formulation which is suitable for and/or intended for use as a fuel additive, in particular a diesel fuel additive, in which case the EGR deposit control additive may be included in such a formulation for the purpose of reducing the build-up of deposits in the EGR system of a compression ignition engine into which a fuel composition is, or is intended to be, introduced.

Thus, the EGR deposit control additive may be incorporated into an additive formulation or package along with one or more other fuel additives. It may, for instance, be combined, in an additive formulation, with one or more fuel additives selected from detergents, anti-corrosion additives, esters, poly alpha olefins, long chain organic acids, components containing amine or amide active centres, and mixtures thereof. In particular, it may be combined with one or more so-called performance additives, which will typically include at least a detergent.

The EGR deposit control additive may be dosed directly into a fuel component or composition, for example at the refinery. It may be pre-diluted in a suitable fuel component which subsequently forms part of the overall automotive fuel composition.

In accordance with the present invention, two or more EGR deposit control additives may be used in an automotive fuel composition for the purpose(s) described above.

The present invention may in particular be applicable where the fuel composition is used or intended to be used in a direct injection diesel engine, for example of the rotary pump, in-line pump, unit pump, electronic unit injector or common rail type, or in an indirect injection diesel engine. The fuel composition may be suitable for use in heavy- and/or light-duty diesel engines, and in engines designed for on-road use, off-road use, marine and rail applications.

The invention is illustrated by the following non-limiting examples.

Examples

Engine Test Method A

A B7 diesel fuel composition complying with EN590 and optionally comprising one or more EGR deposit reducing additives, was combusted in a turbo charged intercooled direct injection Common Rail 1.6 litre engine fitted with an exhaust gas recirculation (EGR) system (PSA Group, France). The base engine used above was selected from a Peugeot Partner Tepee vehicle.

The engine specifications were as follows:

Engine type: DV6C E5
Number of cylinders: 4
Number of valves: 8
30 Stroke: 88.3 mm
Bore: 75 mm
Displacement: 1560 $cm^3$
Fuel injection system: Direct Injection Common Rail
Turbo: Variable geometry
Power: 82 kW @ 3600 rpm
Torque: 270 Nm @ 1750 rpm The test method was as follows:

The cleaned and dried EGR system components, namely the intake plastic pipe, the EGR outlet pipe, the EGR valve, the EGR cooler and the EGR housing, were individually weighed. The EGR components were then assembled to the engine.

The fuel was changed to the test fuel, by purging the system with 7 litres of the test fuel and changing the fuel filters.

The engine test was started:

A warm up cycle was run (idle for 2 minutes, then 1500 rpm at 10 kW for 5 minutes, then 2500 rpm at 20 kW for 5 minutes).

A 'burn off' cycle was run to remove/stabilise deposits in the engine system components outside of the EGR system (3500 rpm at 40 kW for 2 hours).

The average engine parameter data was logged for the first and second hour segments.

The engine was operated for 24 hours (2500 rpm and 5 kW), with a coolant temperature setpoint of 37° C. An average log of all measured engine parameters was taken for every 10 minute period.

As part of the engine test, gaseous emissions were measured at the beginning, middle and end of test.

The engine was stopped and allowed to cool down for 15 minutes. The EGR system was then immediately removed. The EGR components were removed and dismantled. The EGR system components as described above were individually weighed (providing wet deposit weights). The EGR system components as described above were dried in an oven at 50° C., then individually weighed (providing dry deposit weights).

Deposit was scraped off the EGR cooler, from within the heat exchanger tubes. This sample was retained for further analysis.

The EGR system components as described above were cleaned in a high temperature detergent bath, then thoroughly rinsed with heptane and dried in an oven for 2 hours at 50° C.

They were then weighed and reassembled as described above, for the next experiment.

Engine Test Method B

Method B was identical to Method A in all respects other than in Method B, the diesel fuel composition additionally comprised a commercially available additive package comprising a nitrogen containing detergent, other minor components and solvent.

In the following examples, control engine tests were carried out before and/or after each test engine test to take account of the natural variation in the performance of the engine over time, and to account for other factors such as the need to use multiple batches of B7 base fuel for prolonged studies (each accelerated test requires approximately 100 L of fuel).

For the same reasons, average values for Total Dry Deposit Mass (g) for comparative and/or inventive engine tests are calculated from smaller groups of engine tests, rather than calculating a long-term average from the entire study dataset. In these groups, the same base fuel batch was used and the experiments were run within the space of approximately one week.

Example 1

A sequence of engine tests was carried out according to Method A as shown above. All runs were carried out without EGR deposit reducing additive, with the exception of Example 1b where the B7 base fuel was treated with 2-ethylhexyl nitrate (2-EHN) (600 ppm). The results are shown in Table 1:

TABLE 1

| | | | Dry Deposit Mass (g) | | | | | |
|---|---|---|---|---|---|---|---|---|
| E.g. | Additive | Treat Rate (ppm) | Intake Plastic Pipe | EGR Outlet Pipe | EGR Valve | EGR Cooler | EGR Housing | Total Dry Deposit Mass (g) |
| 1a* | — | 0 | 0.45 | 1.48 | 0.05 | 9.47 | 2.96 | 14.41 |
| 1b | 2-EHN | 600 | 0.61 | 0.76 | 0.07 | 6.57 | 2 | 10.01 |
| 1c* | — | 0 | 0.6 | 1.29 | 0.16 | 9.01 | 2.64 | 13.7 |

*Comparative Example

From Examples 1a and 1c, the average Total Dry Deposit Mass in the absence of 2-EHN was calculated as 14.06 g.

The % reduction in EGR deposit due to the application of 2-EHN (600 ppm) under the Method A test condition was calculated as 28.8%.

Example 2

A sequence of engine tests was carried out according to Method B as shown above. In example 2a, the B7 base fuel (which also comprised a commercial detergent package) was treated with 2-EHN (600 ppm). The results of Example 2 are shown in Table 2 below.

TABLE 2

| | | | Dry Deposit Mass (g) | | | | | |
|---|---|---|---|---|---|---|---|---|
| E.g. | Additive | Treat Rate (ppm) | Intake Plastic Pipe | EGR Outlet Pipe | EGR Valve | EGR Cooler | EGR Housing | Total Dry Deposit Mass (g) |
| 2a | 2-EHN | 600 | 1.08 | 1.02 | 0.11 | 7.71 | 2.26 | 12.18 |
| 2b* | — | 0 | 1.19 | 2.37 | 0.26 | 9.7 | 3.24 | 16.76 |

*Comparative Example

The % reduction in EGR deposit due to the application of 2-EHN (600 ppm) under the Method B test condition was calculated as 27.3%.

Example 3

A sequence of engine tests was carried out according to Method B as shown above. In example 3b, the B7 base fuel (which also comprised a commercial additive package) was treated with 2-EHN (300 ppm). The results of Example 3 are shown in Table 3 below.

TABLE 3

| | | | Dry Deposit Mass (g) | | | | | |
|---|---|---|---|---|---|---|---|---|
| E.g. | Additive | Treat Rate (ppm) | Intake Plastic Pipe | EGR Outlet Pipe | EGR Valve | EGR Cooler | EGR Housing | Total Dry Deposit Mass (g) |
| 3a | 2-EHN | 300 | 0.82 | 1.27 | 0.09 | 8.45 | 2.44 | 13.07 |
| 3b* | — | 0 | 1.2 | 2.95 | 0.14 | 9.54 | 3.4 | 17.23 |

TABLE 3-continued

| E.g. | Additive | Treat Rate (ppm) | Dry Deposit Mass (g) Intake Plastic Pipe | EGR Outlet Pipe | EGR Valve | EGR Cooler | EGR Housing | Total Dry Deposit Mass (g) |
|---|---|---|---|---|---|---|---|---|

*Comparative Example

The % reduction in EGR deposit due to the application of 2-EHN (300 ppm) under the Method B test condition was calculated as 24.1%.

Example 4

A sequence of engine tests was carried out according to Method B as shown above. In example 4b and 4c, the B7 base fuel (which also comprised a commercial detergent package) was treated with 2-EHN (150 ppm). The results of Example 5 are shown in Table 4 below.

TABLE 4

| | | | Dry Deposit Mass (g) | | | | | |
|---|---|---|---|---|---|---|---|---|
| E.g. | Additive | Treat Rate (ppm) | Intake Plastic Pipe | EGR Outlet Pipe | EGR Valve | EGR Cooler | EGR Housing | Total Dry Deposit Mass (g) |
| 4a* | — | 0 | 1.37 | 1.82 | 0.38 | 9.5 | 3.3 | 16.37 |
| 4b | 2-EHN | 150 | 0.64 | 1.25 | 0.21 | 7.77 | 2.72 | 12.59 |
| 4c | 2-EHN | 150 | 1.04 | 1.16 | 0.04 | 7.82 | 2.56 | 12.62 |
| 4d* | — | 0 | 1.1 | 1.71 | 0.14 | 9.03 | 2.92 | 14.9 |

*Comparative Example

From Examples 4a and 4d, the average Total Dry Deposit Mass in the absence of 2-EHN was calculated as 15.64 g.

From Examples 4b and 4c, the average Total Dry Deposit Mass when the fuel was additized with 2-EHN (150 ppm) was calculated as 12.61 g.

The % reduction in EGR deposit due to the application of 2-EHN (150 ppm) under the Method A test condition was calculated as 19.4%.

Example 5

A sequence of engine tests was carried out according to Method B as shown above. In examples 5b and 5c, the B7 base fuel (which also comprised a commercial detergent package) was treated with 2-EHN (75 ppm). The results of Example 5 are shown in Table 5 below.

TABLE 5

| | | | Dry Deposit Mass (g) | | | | | |
|---|---|---|---|---|---|---|---|---|
| E.g. | Additive | Treat Rate (ppm) | Intake Plastic Pipe | EGR Outlet Pipe | EGR Valve | EGR Cooler | EGR Housing | Total Dry Deposit Mass (g) |
| 5a* | — | 0 | 1.1 | 1.71 | 0.14 | 9.03 | 2.92 | 14.9 |
| 5b | 2-EHN | 75 | 1.01 | 1.28 | 0.14 | 8.52 | 2.68 | 13.63 |
| 5c | 2-EHN | 75 | 0.77 | 1.06 | 0.04 | 7.48 | 2.28 | 11.63 |
| 5d* | — | 0 | 1.08 | 1.59 | 0.12 | 8.81 | 2.8 | 14.4 |

*Comparative Example

From Examples 5a and 5d, the average Total Dry Deposit Mass in the absence of 2-EHN was calculated as 14.65 g.

From Examples 5b and 5c, the average Total Dry Deposit Mass when the fuel was additized with 2-EHN was calculated as 12.63 g.

The % reduction in EGR deposit due to the application of 2-EHN (75 ppm) under the Method B test condition was calculated as 13.8%.

The results of Examples 2, 3, 4 and 5 showed that 2-EHN was an effective diesel fuel additive for reducing the build-up of EGR deposits, when the diesel fuel was further additized with a detergent package.

The results of Examples 2, 3, 4 and 5 are shown in FIG. 1.

Example 6

A sequence of engine tests was carried out according to Method B as shown above. In examples 6b and 6c, the B7 base fuel (which also comprised a commercial detergent package) was treated with 2-EHN (75 ppm). The results of Example 6 are shown in Table 6 below.

TABLE 6

| E.g. | Additive | Treat Rate (ppm) | Dry Deposit Mass (g) Intake Plastic Pipe | EGR Outlet Pipe | EGR Valve | EGR Cooler | EGR Housing | Total Dry Deposit Mass (g) |
|---|---|---|---|---|---|---|---|---|
| 6a* | — | 0 | 1.08 | 1.59 | 0.12 | 8.81 | 2.8 | 14.4 |
| 6b | 2-EHN and DTBP (1:1) | 150 (total) | 1.03 | 0.98 | 0.17 | 7.19 | 2.3 | 11.67 |
| 6c* | — | 75 | 1.03 | 1.43 | 0.16 | 8.51 | 2.62 | 13.75 |

*Comparative Example

From Examples 6a and 6c, the average Total Dry Deposit Mass in the absence of EGR deposit control additives was calculated as 14.08 g.

The % reduction in EGR deposit due to simultaneous application of 2-EHN (75 ppm) and DTBP (75 ppm) under the Method B test condition was calculated as 17.1%.

The result of Example 6 showed that a combination of 2-EHN and DTBP was an effective diesel fuel additive for the reduction of EGR deposits when the diesel fuel was further additized with a detergent package.

Example 7

A sequence of engine tests was carried out according to Method A as shown above. In Example 7b, the B7 base fuel was treated with 2-EHN (5000 ppm).

The results of Example 7 are shown in Table 7:

TABLE 7

| Ex | Additive | Treat Rate (ppm) | Dry Deposit Mass (g) Intake Plastic Pipe | EGR Outlet Pipe | EGR Valve | EGR Cooler | EGR Housing | Total Dry Deposit Mass (g) |
|---|---|---|---|---|---|---|---|---|
| 7a* | — | 0 | 0.30 | 1.38 | 0.09 | 8.63 | 2.74 | 14.5 |
| 7b | 2-EHN | 5000 | 0.59 | 0.53 | 0.09 | 5.00 | 1.60 | 7.81 |
| 7c* | — | 0 | 0.37 | 1.89 | 0.17 | 8.99 | 3.08 | 13.5 |

*Comparative Example

From Examples 7a and 7c, the average Total Dry Deposit Mass in the absence of EGR deposit control additives was calculated as 14.00 g.

The % reduction in EGR deposit due to application of 2-EHN (5000 ppm) under the Method A test condition is calculated as 44.21%.

Example 8

A sequence of engine tests was carried out according to Method B as shown above. In Example 8b, the B7 base fuel (which also comprised a commercial detergent package) was treated with decyl nitrate (600 ppm).

The results of Example 8 are shown in Table 8:

TABLE 8

| Ex | Additive | Treat Rate (ppm) | Dry Deposit Mass (g) Intake Plastic Pipe | EGR Outlet Pipe | EGR Valve | EGR Cooler | EGR Housing | Total Dry Deposit Mass (g) |
|---|---|---|---|---|---|---|---|---|
| 8a* | — | 0 | 1.06 | 1.18 | 0.06 | 8.55 | 2.75 | 13.6 |
| 8b | Decyl nitrate | 600 | 0.77 | 0.90 | 0.05 | 7.97 | 2.14 | 11.83 |
| 8c* | — | 0 | 0.88 | 1.16 | 0.09 | 8.91 | 2.44 | 13.48 |

*Comparative Example

From Examples 8a and 8c, the average Total Dry Deposit Mass in the absence of EGR deposit control additives was calculated as 13.54 g.

The % reduction in EGR deposit due to application of decyl nitrate (600 ppm) under the Method B test condition is calculated as 12.63%.

Example 9

A sequence of engine tests was carried out according to Method B as shown above. In Example 9b, the B7 base fuel (which also comprised a commercial detergent package) was treated with dodecyl nitrate (600 ppm).

The results of Example 9 are shown in Table 9:

TABLE 9

| Ex | Additive | Treat Rate (ppm) | Dry Deposit Mass (g) Intake Plastic Pipe | EGR Outlet Pipe | EGR Valve | EGR Cooler | EGR Housing | Total Dry Deposit Mass (g) |
|---|---|---|---|---|---|---|---|---|
| 9a* | None | 0 | 1.06 | 1.18 | 0.06 | 8.55 | 2.75 | 13.6 |
| 9b | Dodecyl nitrate | 600 | 0.63 | 0.94 | 0.1 | 8 | 2.2 | 11.87 |
| 9c* | none | 0 | 0.88 | 1.16 | 0.09 | 8.91 | 2.44 | 13.48 |

*Comparative Example

From Examples 9a and 9c, the average Total Dry Deposit Mass in the absence of EGR deposit control additives was calculated as 13.54 g.

The % reduction in EGR deposit due to application of dodecyl nitrate (600 ppm) and under the Method B test condition is calculated as 12.33%.

Example 10

A sequence of engine tests was carried out according to Method B as shown above. In Example 10b, the B7 base fuel (which also comprised a commercial detergent package) was treated with dodecyl nitrate (600 ppm).

The results of Example 10 are shown in Table 10:

TABLE 10

| Ex | Additive | Treat Rate (ppm) | Dry Deposit Mass (g) Intake Plastic Pipe | EGR Outlet Pipe | EGR Valve | EGR Cooler | EGR Housing | Total Dry Deposit Mass (g) |
|---|---|---|---|---|---|---|---|---|
| 10a* | — | 0 | 1.28 | 1.6 | 0.14 | 8.41 | 3.14 | 14.57 |
| 10b | Isopropyl nitrate | 600 | 1.3 | 1.16 | 0.11 | 7.14 | 2.41 | 12.12 |
| 10c* | — | 0 | 0.77 | 1.3 | 0.13 | 7.44 | 2.61 | 12.25 |

*Comparative Example

From Examples 10a and 10c, the average Total Dry Deposit Mass in the absence of EGR deposit control additives was calculated as 13.41 g.

The % reduction in EGR deposit due to application of isopropyl nitrate (600 ppm) and under the Method B test condition is calculated as 9.62%.

We claim:

1. A method for reducing a build-up of deposits in an Exhaust Gas Recirculation (EGR) system of a compression ignition internal combustion engine comprising the steps of (i) introducing into said engine a diesel fuel composition which comprises an additive selected from alkyl nitrates, wherein the alkyl nitrates are selected from compounds having a formula $R^1$-ONO2 wherein $R^1$ is an optionally substituted branched chain C2-C20 alkyl group; -(ii) combusting said diesel fuel composition in said engine; and (iii) measuring the reduction in the build-up of deposits in the EGR system.

2. The method of claim 1 wherein the EGR system is a short loop EGR system.

3. The method of claim 1 wherein the compression ignition internal combustion engine comprises a fuel system having a rated operating pressure of greater than 1300 bar.

4. The method of claim 1 wherein $R^1$ is an unsubstituted C2-C20 alkyl group.

5. The method of claim 1 wherein the additive is 2-ethylhexyl nitrate.

6. The method of claim 1 wherein the level of additive is in the range of from 1 to 5000 ppm, based on the total weight of the diesel fuel composition.

7. The method of claim 1 wherein the level of additive is in the range of from 20 to 2000 ppm, based on the total weight of the diesel fuel composition.

8. The method of claim 1 wherein the level of additive is in the range of from 50 to 500 ppm, based on the total weight of the diesel fuel composition.

* * * * *